(12) United States Patent
Mirabito

(10) Patent No.: US 8,719,976 B2
(45) Date of Patent: May 13, 2014

(54) EQUIPMENT FOR USE AT A CARWASH

(75) Inventor: John Mirabito, Wheelers Hill (AU)

(73) Assignee: Federal Oil Australia Pty Limited, Wheelers Hill (AU)

( * ) Notice: Subject to any disclaimer, the term of this patent is extended or adjusted under 35 U.S.C. 154(b) by 0 days.

(21) Appl. No.: 13/576,651

(22) PCT Filed: Feb. 2, 2011

(86) PCT No.: PCT/AU2011/000096
§ 371 (c)(1),
(2), (4) Date: Nov. 6, 2012

(87) PCT Pub. No.: WO2011/094801
PCT Pub. Date: Aug. 11, 2011

(65) Prior Publication Data
US 2013/0047332 A1    Feb. 28, 2013

(30) Foreign Application Priority Data
Feb. 2, 2010 (AU) ................................ 2010900397

(51) Int. Cl.
*A47K 1/04* (2006.01)
*E03C 1/14* (2006.01)

(52) U.S. Cl.
USPC .................................................. 4/650; 4/628

(58) Field of Classification Search
USPC ................................. 4/624, 628, 650
See application file for complete search history.

(56) References Cited

U.S. PATENT DOCUMENTS

| 4,606,085 | A | * | 8/1986 | Davies | .............................. 4/623 |
| 4,967,960 | A | | 11/1990 | Futrell | |
| 5,540,362 | A | * | 7/1996 | Azuma et al. | ..................... 4/628 |
| 5,960,513 | A | | 10/1999 | Beshah | |
| 6,585,011 | B2 | | 7/2003 | Willeke, Jr. et al. | |

FOREIGN PATENT DOCUMENTS

AU    2010900397    2/2010
WO    WO 2011/094801    8/2011

OTHER PUBLICATIONS

International Search Report and Written Opinion of PCT/AU2011/000096, Feb. 25, 2011 (mailing date), Federal Oil Australia PTY Limited.
International Preliminary Report on Patentability of PCT/AU2011/000096, Aug. 16, 2012 (mailing date), Federal Oil Australia PTY Limited.

* cited by examiner

*Primary Examiner* — Tuan N Nguyen
(74) *Attorney, Agent, or Firm* — Adeli LLP

(57) ABSTRACT

The invention concerns equipment for use at a carwash. The equipment can be used to wash any vehicle, as well as boats (on trailers) and anything else that can be brought into its vicinity. The equipment comprises a wash stand incorporating a basin sized to receive a car washing sponge. The equipment has an inlet valve to fill the basin, an outlet valve to empty the basin, and a control system to perform a wash sequence as follows: closing the outlet valve; opening the inlet valve to selectively fill the basin with water or a mixture of water and cleaning agent; then, periodically opening the inlet valve to top up the basin with water or a mixture of water and cleaning agent; finally, opening the outlet valve to empty the basin. All the steps of the wash sequence are performed according to a predetermined timing schedule.

24 Claims, 2 Drawing Sheets

EQUIPMENT FOR USE AT A CARWASH

CLAIM OF BENEFIT TO PRIOR APPLICATIONS

Figure 1:
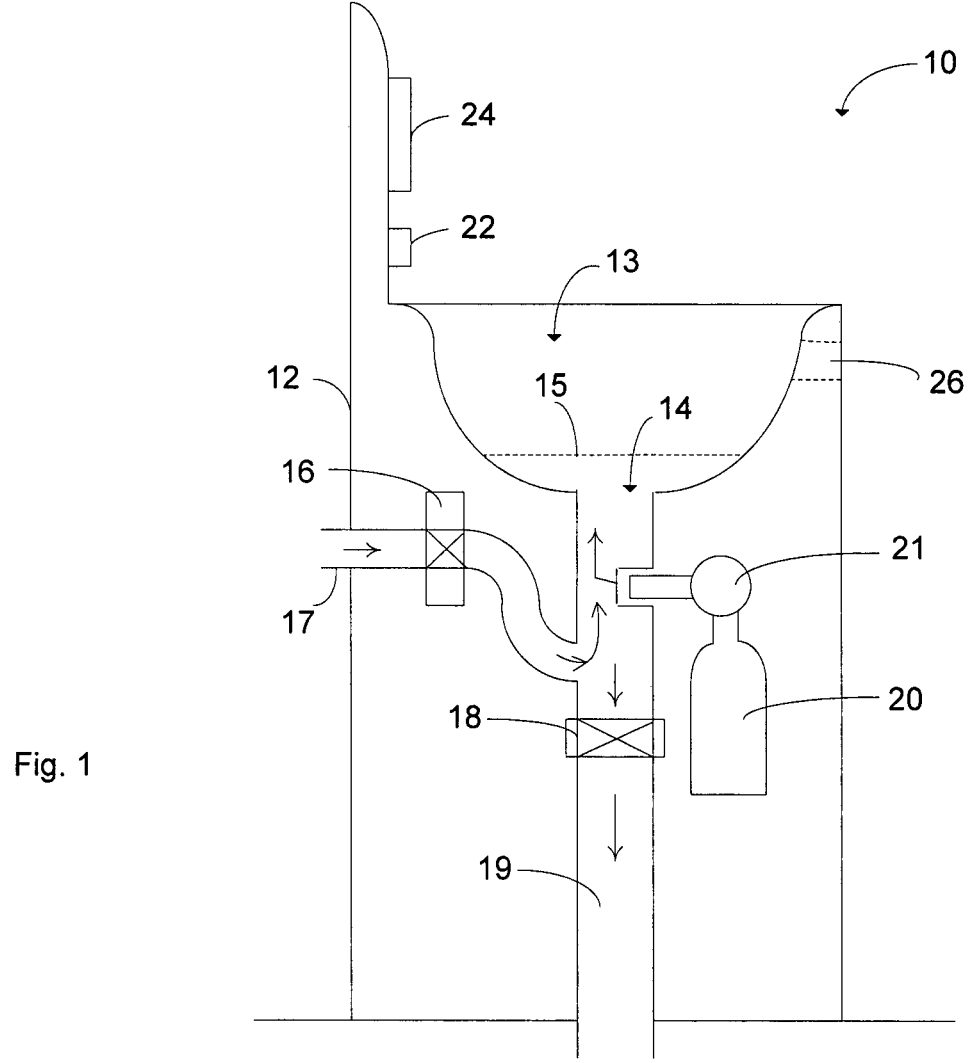

This application is a national stage application of PCT Application PCT/AU2011/000096, entitled "Equipment for use at a Carwash," filed Feb. 2, 2011, now published as WO 2011/094801. PCT Application PCT/AU2011/000096 claims the benefit of Australian Patent Application AU 2010900397, entitled "Automated Bucket Wash System", filed Feb. 2, 2010. PCT Application PCT/AU2011/000096, published as WO 2011/094801 and Australian Patent Application AU 2010900397 are incorporated herein by reference.

TECHNICAL FIELD

The invention concerns equipment for use at a carwash. The equipment can be used to wash any vehicle, as well as boats (on trailers) and anything else that can be brought into its vicinity.

BACKGROUND ART

In the past cars have been washed by hand using a bucket and sponge, and a chamois for drying; this is still regarded as the best way to wash a car. However this method for washing cars is laborious and time consuming, or alternatively expensive to procure.

Inexpensive automatic drive-up car washing stations have been provided to save the trouble of hand washing cars. Traditionally the car is scrubbed by passing between a pair of large vertical rollers. However, these washing stations can treat the car roughly and may cause scratching of the exterior paint, and sometimes other minor damage.

Modern drive-up carwash stations provide a hose with a spray wand and a hogs hair brush similar to a broom, that the user can manipulate around to either spray it or scrub their car. The user may not bring and use their own bucket and sponge, or any other cleaning agents or equipment. Typically the user will pay for the use of the carwash according to the time they require the spray wand and brush to be operating, or for the time they are monopolising the carwash station.

DISCLOSURE OF THE INVENTION

The invention is carwash equipment for use together with a sponge, the equipment comprising a wash stand incorporating a basin sized to receive a car washing sponge, and having:
An inlet valve to fill the basin.
An outlet valve to empty the basin.
And, a control system to perform a wash sequence as follows:
Closing the outlet valve;
Opening the inlet valve to selectively fill the basin with water or a mixture of water and cleaning agent;
Then, periodically opening the inlet valve to top up the basin with water or a mixture of water and cleaning agent;
Finally, opening the outlet valve to empty the basin
All the steps of the wash sequence are performed according to a predetermined timing schedule.

The equipment provides a 'best of both worlds' solution to the trouble associated with car washing by allowing the user to use their own sponge, cloth, squeegee and chamois.

The basin may have a single pipe extending down from it, to both allow water to drain away and to receive incoming water (with or without a cleaning agent). A perforated false bottom may be provided above the pipe to prevent it becoming blocked, for instance if a sponge or cloth was left in the basin before the basin was emptied.

The basin will typically be constructed from a strong and corrosion resistant material such as stainless steel. It may be fitted with an overflow to prevent flooding of the station in case of malfunction. The basin may be built in to a stainless steel wash stand that supports it at an appropriate height and protects the pipes, valves and control system.

The inlet valve may be connected between the pipe and a mains water supply.

The outlet valve may be connected between the pipe and a drain.

The equipment may also comprise a manually operated hose or spray wand for rinsing.

The equipment may also comprise a vacuum cleaner for cleaning the interior of the vehicle.

When a wash sequence is initiated, the control system may commence with a preliminary flush sequence, as follows:
Opening the outlet valve to drain the basin.
Closing the outlet valve.
Opening the inlet valve to fill the basin with clean water.
Closing the inlet valve.
Finally, opening the outlet valve to drain the basin.
Again, all the steps of the sequence are performed according to a predetermined timing schedule.

Alternatively, the flush sequence may be automatically activated at the end of wash program. In any event the aim of the flush sequence is to ensure the basin is left clean for the next user. This is useful since the basin may contain contaminants or abrasive particles let over from its last use, or otherwise deposited in the basin.

The equipment may also have its operation optimised to local conditions. For instance, the periods of time allowed for filling or topping up the basin may be adjusted to take account of the water pressure available.

Also, the temperature of the water may be controlled, for instance a heater may be provided to heat the water to a given temperature, say, to ensure it is not uncomfortably cold in winter.

Furthermore, a reservoir of cleaning agent may be included within the wash stand. The reservoir may be connected to insert the cleaning agent into water flowing from the inlet valve into the basin, upstream of the inlet valve, during the wash sequence. Cleaning agent may be taken from the reservoir and injected into water flowing into the basin automatically, for instance using the venturi effect. Alternatively, it may be actively injected into the water. In this case the control system may operate to turn on a pump for a given period of time, while the inlet valve is open, to introduce a predetermined quantity of the cleaning agent into the water flowing into the basin. The cleaning agent may be soap. The pump may be a peristaltic pump. The pump may require to be primed before each new wash sequence is commenced.

The control system will generally have a timer and relays that operate the valves. There may also be a selector for the preliminary flush function, and to select the number of refills and the time between them. There may also be 'ON' and 'OFF' buttons for use to start and stop operation of the equipment.

The control system may comprise any desired level of complexity. For instance a computer could control one or more of the wash stands. At the other end of the spectrum a simple control panel might be provided with a number of switches; similar to a washing machine. An LCD screen and a keypad associated with each wash stand has been found to provide an effective interface for the user.

In a large installation having many carwash stations the user may prepay at a kiosk according to the number of cycles required, the time the station will be monopolized or according to some function of both the time and number of refills. An attendant may be available to accept payment and monitor the equipment. Alternatively the user may pay after using the station. In another alternative the user may pay per refill, for instance by inserting coins into a coin freed mechanism, or by presenting a debit, credit or charge card.

In another aspect the invention is a method for automatically operating a basin at a carwash to perform a wash sequence, comprising:

Opening an inlet valve for a period of time to selectively fill the basin with water or a mixture of water and cleaning agent.

Opening an outlet valve for another period of time to empty the basin.

And after a further period of time, repetitively topping up the basin with water or a mixture of water and cleaning agent according to a predetermined timing schedule.

And optionally commencing the wash sequence with a preliminary flush sequence, comprising:

Opening the outlet valve for a period of time to drain the basin.

Closing the outlet valve.

Opening the inlet valve for another period to fill the basin with clean water.

Closing the inlet valve.

Finally, opening the outlet valve for a further period to drain the basin.

In a further aspect the invention is software to perform the method.

BRIEF DESCRIPTION OF THE INVENTION

An example of the invention will now be described with reference to the accompanying drawing, in which:

FIG. 1 which is a schematic diagram of equipment for use at a carwash station.

Figure 2:
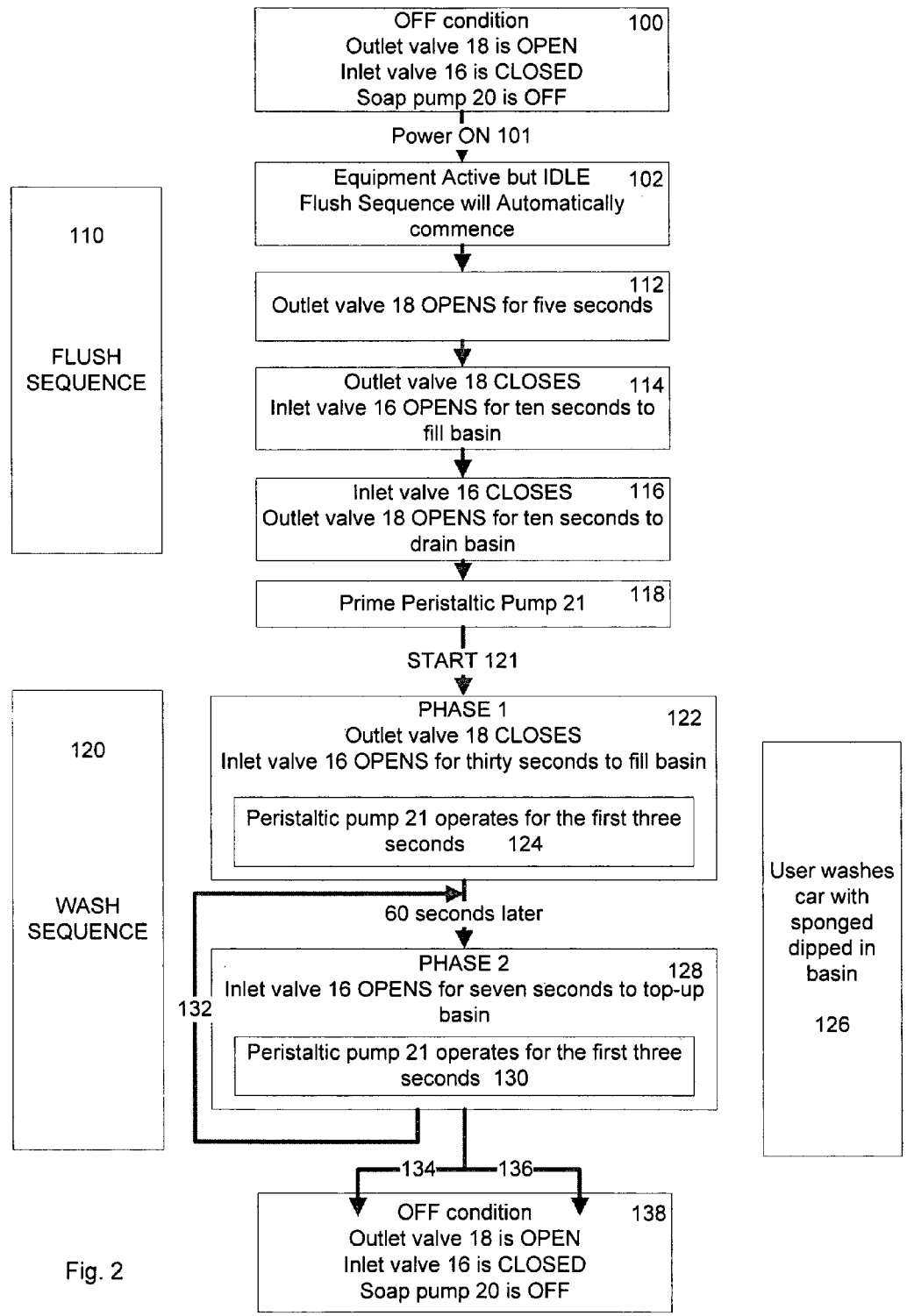

FIG. 2 is a flow chart of the operating sequence of the equipment.

BEST MODES OF THE INVENTION

Referring first to FIG. 1, the carwash equipment 10 is installed alongside a parking bay at a self serve drive-up carwash. The equipment is designed for use together with a sponge that the user may provide. The equipment comprises a stainless steel wash stand 12 incorporating a stainless steel basin 13 sized to receive a car washing sponge. The basin has a single port 14 at its bottom for the entry and exit of liquid. A perforated false bottom 15 is provided in the basin 13 above port 14 to prevent the port being blocked. The wash stand has an inlet valve 16 in a mains supply line 17 to fill the basin through port 14. The basin also has an outlet valve 18 to empty the basin through port 14 into waste line 19. A soap supply 20 is connected to a peristaltic pump 21 to selectively insert soap into the mains water as it enters the basin.

A built-in control system includes a processor (not shown) connected to keypad 22 to receive command inputs from the user, and to an Liquid Crystal Display (LCD) 24 to convey information back to the user. A 24V ac power supply (not shown) is also housed within the wash stand to receive mains power and supply it to the wash stand.

The flush 110 and wash 120 sequences will now be described with reference to FIG. 2:

In general when there is no electrical power supplied to the system, it is in the OFF condition 100. In this condition the waste outlet valve 18 is OPEN, the mains water valve 16 is CLOSED, and the soap pump 20 is OFF.

When electrical power is supplied to the system, for instance by pressing an 'ON' button 101, the system will assume an active but IDLE condition 102. It will then automatically perform a FLUSH SEQUENCE 110 to clean the wash basin 13 of any contaminants.

During the FLUSH SEQUENCE 110:

The outlet valve 18 will OPEN for five seconds to drain any water from the basin 13; 112.

Then the outlet valve 18 will CLOSE and the inlet valve 16 will OPEN for ten seconds to supply clean water in the basin 13; 114.

Finally, the inlet valve 16 will CLOSE and the outlet valve 18 will OPEN for ten seconds to drain the basin 13 after flushing; 116.

Before a wash sequence commences, it may be necessary to prime the peristaltic pump 21 with soap from reservoir 20; 118. This may be done manually by pressing a button marked 'PUMP PRIMING' on keypad 22. However, pump priming is a function normally carried out automatically or by an operator or administrator of the car wash.

The system 10 is now ready to perform a WASH SEQUENCE 120. The user is invited to press a 'START' button on keypad 22 to commence the wash sequence when they are ready; 121.

In a first phase of operation, the outlet valve 18 will CLOSE and the inlet valve 16 will OPEN for thirty seconds to fill the basin; 122.

During the first three seconds of filling the peristaltic pump 21 is operated to add soap to the water flowing into the basin; 124. This allows a sufficient quantity of soap to mix with the water filling the basin to form an effective cleaning formulation for use by the user to wash his or her car.

The user then takes their sponge, or other applicator, and dips it into the soapy water in the basin and starts washing their car in the conventional; 126.

A second phase of operation begins automatically sixty seconds after the first phase has been performed. In this phase, and any subsequent repeats of it, the inlet valve 16 will OPEN for seven seconds to refill the basin 14; 128. The soap pump 21 will operate for only the first 3 seconds of that period; 130. This refreshes the soap in the water in the basin.

This phase will be repeated a predetermined number of times 132, for instance depending on how much the user has paid.

The timing sequence is programmed to satisfy the needs of efficient use of water and effective washing of the car. Too short a time between refills may be wasteful of water, whilst too long a time between refills may result in dirty or less soapy water being applied by the sponge to the car.

The basin 14 has an emergency overflow outlet aperture 26 below its upper rim so that if, during any wash sequence, too much water is supplied through the inlet valve 16 or the level of the cleaning formulation otherwise rises too high, excess formulation can drain away.

The wash sequence may be terminated by the user pressing a STOP button on keypad 22; 134. However, the user may run out of time; for instance when they are paying for the time; 136. The system will then resume an active but IDLE condition 102.

The system may then automatically perform a FLUSH SEQUENCE 110 to clean the wash basin 13 of any contaminants. Alternatively it may then enter the OFF condition.

In any event the user may use other equipment at the station, such as a hose for rinsing or a vacuum cleaner before leaving.

It will be apparent to persons skilled in this field that various modifications may be made in details of design and construction of the equipment, and in the steps of its operating sequences.

The invention claimed is:

1. Carwash equipment for use together with a sponge, the equipment comprising a wash stand incorporating a basin sized to receive a car washing sponge, and having:
   an inlet valve to fill the basin;
   an outlet valve to empty the basin; and,
   a control system to perform a wash sequence as follows:
      closing the outlet valve,
      opening the inlet valve to selectively fill the basin with water or a mixture of water and cleaning agent,
      then, periodically opening the inlet valve to top up the basin with water or a mixture of water and cleaning agent,
      finally, opening the outlet valve to empty the basin;
   wherein all steps of the wash sequence are performed according to a predetermined timing schedule.

2. Carwash equipment according to claim 1, wherein the basin has a single pipe extending down from it, to both allow water to drain away and to receive incoming water.

3. Carwash equipment according to claim 1, wherein a perforated false bottom is provided above the pipe to prevent it becoming blocked.

4. Carwash equipment according to claim 1, wherein the basin is constructed from stainless steel.

5. Carwash equipment according to claim 1, wherein the basin is fitted with an overflow to prevent flooding of the carwash station in case of malfunction.

6. Carwash equipment according to claim 1, wherein the basin is built in to a stainless steel wash stand that supports it at an appropriate height and protects pipes, the valves and the control system.

7. Carwash equipment according to claim 1, wherein the inlet valve is connected between the pipe and a mains water supply.

8. Carwash equipment according to claim 1, wherein the outlet valve is connected between the pipe and a drain.

9. Carwash equipment according to claim 1, wherein the equipment also comprises one of a manually operated hose and a spray wand for rinsing.

10. Carwash equipment according to claim 1, wherein the equipment also comprises a vacuum cleaner for cleaning an interior of a vehicle.

11. Carwash equipment according to claim 1, wherein when the wash sequence is initiated, the control system commences with a preliminary flush sequence, as follows:
   opening the outlet valve to drain the basin,
   closing the outlet valve,
   opening the inlet valve to fill the basin with clean water,
   closing the inlet valve,
   finally, opening the outlet valve to drain the basin;
   wherein all the steps of the flush sequence are performed according to a predetermined timing schedule.

12. Carwash equipment according to claim 1, wherein a flush sequence is automatically activated at the end of the wash sequence, as follows:
   opening the outlet valve to drain the basin,
   closing the outlet valve,
   opening the inlet valve to fill the basin with clean water,
   closing the inlet valve,
   finally, opening the outlet valve to drain the basin;
   wherein all the steps of the flush sequence are performed according to a predetermined timing schedule.

13. Carwash equipment according to claim 1, wherein the equipment has its operation optimised to local conditions.

14. Carwash equipment according to claim 1, wherein the temperature of the water is controlled.

15. Carwash equipment according to claim 1, wherein a reservoir of cleaning agent is included within the wash stand.

16. Carwash equipment according to claim 15, wherein the reservoir is connected to insert the cleaning agent into water flowing from the inlet valve into the basin, upstream of the inlet valve, during the wash sequence.

17. Carwash equipment according to claim 16, wherein the cleaning agent is actively injected into the water by turning on a pump for a given period of time, while the inlet valve is open.

18. Carwash equipment according to claim 15, wherein the cleaning agent is soap.

19. Carwash equipment according to claim 17, wherein the pump is a peristaltic pump.

20. Carwash equipment according to claim 19, wherein the pump requires priming before each new wash sequence is commenced.

21. Carwash equipment according to claim 1, wherein the control system has a timer and relays that operate the valves, a selector for a preliminary flush function, and to select a number of refills and a time between them.

22. A method for automatically operating a basin at a carwash to perform a wash sequence, comprising:
   opening an inlet valve for a period of time to selectively fill the basin with water or a mixture of water and a cleaning agent;
   opening an outlet valve for another period of time to empty the basin; and,
   after a further period of time, repetitively topping up the basin with water or a mixture of water and the cleaning agent according to a predetermined timing schedule.

23. A method according to claim 22, comprising a preliminary flush sequence, comprising:
   opening the outlet valve for a period of time to drain the basin;
   closing the outlet valve;
   opening the inlet valve for another period of time to fill the basin with clean water;
   closing the inlet valve;
   finally, opening the outlet valve for a further period of time to drain the basin.

24. Software to perform the method according to claim 22.

* * * * *